Patented Sept. 17, 1929

1,728,567

UNITED STATES PATENT OFFICE

ERNST WOLFGANG KOHLSCHÜTTER, OF HAMBURG, GERMANY

BELTING OF WOVEN FIBROUS MATERIAL

No Drawing. Application filed June 1, 1927, Serial No. 195,857, and in Germany April 13, 1926.

For impregnating belting made of woven fibrous material benzol solutions of gutta-percha-like asphaltic bitumens have been found to be the most satisfactory. These bitumens, however, always contain considerable quantities of greasy paraffinic constituents which for some uses, to which the belting is put, are found to be inconvenient, for instance when such impregnated belting is used for brake bands, but more particularly when these impregnated beltings are to be subsequently covered on both sides with caoutchouc or the like.

The following process has proved successful:

The finished woven fibrous belting is placed in a pressure vessel which can be heated by means of a steam jacket or heating coils, and the vessel is thereupon closed and evacuated.

A solution of 1 part of asphaltic bitumens similar in plasticity to gutta-percha in 1 to 2 parts of commercial benzol is thereupon allowed to flow into the vessel, and the whole is then heated by means of the steam jacket or the heating coils up to slightly above 100° C. As is well-known, hot benzol is sufficiently capable of dissolving the small quantities of moisture which are driven out of the fibres at a temperature of slightly above 100° C. The heating produces a pressure of several atmospheres in the vessel. A valve in the bottom of the vessel is thereupon opened and the hot impregnating solution allowed to flow out into a suitable receptacle, whereupon the bottom valve is closed and a vacuum again produced, causing the impregnating solution retained in the fibrous belting by capillary action to be evaporated. At the same time the last traces of water evaporate which have been split off out of the fibres. A sufficient quantity of acetone or alcohol for dissolving the greasy paraffinic constituents of the asphaltic bitumens used is then allowed to flow into the vessel, a pressure above that of the atmosphere being again produced by applying heat by means of the steam jacket or the heating coil. By this means the greasy paraffinic constituents of the bitumen will be removed to a sufficient extent. The acetone or alcohol solution is again allowed to flow into a suitable receptacle after which a vacuum is again produced. The last traces of the solvent will then evaporate rapidly and completely. The completely dry belting can now be used as a brake band or be coated with guttapercha, balata or caoutchouc, as described in German Patents 306,518 and 355,106.

What I claim is:—

A process for impregnating belting made from woven fibrous material which comprises impregnating the belting with a hot benzol solution of gutta-percha-like asphaltic bitumens, evaporating the benzol from the impregnated belting and then treating the impregnated belting with a solvent for the greasy paraffinic constituents only of the bitumens.

In testimony whereof I have signed my name to this specification.

ERNST WOLFGANG KOHLSCHÜTTER.